(12) United States Patent
Tinnakornsrisuphap et al.

(10) Patent No.: US 7,990,925 B2
(45) Date of Patent: Aug. 2, 2011

(54) METHOD AND APPARATUS FOR COMMUNICATION HANDOFF

(75) Inventors: Peerapol Tinnakornsrisuphap, San Diego, CA (US); Fatih Ulupinar, San Diego, CA (US); Jun Wang, La Jolla, CA (US); Parag Arun Agashe, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 351 days.

(21) Appl. No.: 12/128,903

(22) Filed: May 29, 2008

(65) Prior Publication Data
US 2009/0046767 A1   Feb. 19, 2009

Related U.S. Application Data

(60) Provisional application No. 60/940,966, filed on May 30, 2007.

(51) Int. Cl.
*H04W 4/00* (2009.01)
(52) U.S. Cl. ........ 370/331; 370/320; 455/332; 455/436; 455/438; 455/439; 455/442
(58) Field of Classification Search ................. 370/320, 370/331; 379/60; 455/33.2, 436, 442, 438, 455/439
See application file for complete search history.

(56) References Cited

U.S. PATENT DOCUMENTS

| | | | |
|---|---|---|---|
| 6,768,726 B2 * | 7/2004 | Dorenbosch et al. | 370/331 |
| 2004/0125795 A1 * | 7/2004 | Corson et al. | 370/356 |
| 2006/0072512 A1 * | 4/2006 | Das et al. | 370/335 |
| 2006/0187937 A1 * | 8/2006 | Townsley et al. | 370/395.53 |

FOREIGN PATENT DOCUMENTS

| | | |
|---|---|---|
| EP | 1696607 A2 | 8/2006 |
| WO | WO2004107702 | 12/2004 |

OTHER PUBLICATIONS

International Search Report and Written Opinion—PCT/US08/065399, International Searching Authority—European Patent Office, May 27, 2009.
Rajeev Koodli et al: "Fast Handovers for Mobile IPv6; claft-ietf-niobileip-fast-mipv6-08.txt" IETF Standard-Working-Draft, Internet Engineering Task Force, IETF, CH, vol. mobileip, No. 8, Oct. 10, 2003, XP015023339 ISSN: 0000-0004 p. 8; figure 2 p. 7, line 3-line 39.

* cited by examiner

*Primary Examiner* — Hassan Phillips
*Assistant Examiner* — Lonnie Sweet
(74) *Attorney, Agent, or Firm* — Darren M. Simon

(57) ABSTRACT

Seamless communication handoff is achieved by establishing a protocol tunnel to route leftover packets between network access nodes during the handoff. For example, in a mobile IP-based system, a mobile node may perform a handoff from a first access node that is associated with a first routing node to a second access node that is associated with a second routing node. To prevent the loss of any packets that may be in route for delivery to or from the first routing node during the handoff, the mobile node establishes a protocol tunnel with the first access node via the second access node. On the forward-link, packets being delivered from the first routing node are routed over the protocol tunnel to the second access node and then to the mobile node. On the reverse-link, packets being sent to the first routing node are routed over the protocol tunnel from the mobile node to the second access node and then to the first routing node. In conjunction with these operations, the mobile node concurrently maintains separate IP interfaces for the routing nodes. In addition, steps are taken to ensure that packets are routed to the appropriate IP interface during the handoff.

34 Claims, 11 Drawing Sheets

METHOD AND APPARATUS FOR COMMUNICATION HANDOFF

CLAIM OF PRIORITY UNDER 35 U.S.C. §119

This application claims the benefit of and priority to commonly owned U.S. Provisional Patent Application No. 60/940,966, filed May 30, 2007, the disclosure of which is hereby incorporated by reference herein.

BACKGROUND

1. Field

This application relates generally to wireless communication and more specifically, but not exclusively, to the routing of packets during a communication handoff.

2. Introduction

The mobile Internet Protocol ("IP") standard promulgated by the Internet Engineering Task Force describes a scheme that enables a mobile node to send and receive packets as it moves within a wireless network. In this scheme, a home (e.g., permanent) IP address may be assigned to the mobile node whereby any other device that wishes to send packets to the mobile node sends the packets to this home IP address. In the event the mobile node is connected to a sub-network other than its home sub-network (i.e., the sub-network associated with the home IP address), packets sent to the home IP address are forwarded to the mobile node at the other sub-network. In this way, the mobile node may receive any packets sent to the home IP address regardless of the current location of the mobile node.

In mobile IP, forwarding of packets in this manner is achieved through the use of mobility agents. For example, when the mobile node establishes communication with a network access node (e.g., a base station) of a sub-network other than its home sub-network, the mobile node registers with a routing node on that sub-network. This routing node may serve as a foreign agent for the mobile node that provides a care of address ("CoA") to which packets destined for the mobile node may be routed. In a typical case, the CoA associated with a foreign agent is the IP address of that foreign agent.

A routing node that is connected to the mobile node's home sub-network is designated as the mobile node's home agent. The home agent intercepts packets sent to the home IP address and forwards the packets via an IP tunnel to the CoA associated with the foreign agent. The foreign agent routes the packets it receives from the IP tunnel to the network access node which then sends the packets to the mobile node.

The foreign agent may route any packets it receives from the mobile node to the designated destination via normal IP routing or it may send them to the home agent. In the latter case, the foreign agent will use the IP tunnel to forward the packets the home agent.

The mobile node may connect to different network access nodes as it roams through the network. Some of these network access nodes may be associated with different foreign agents that are, in turn, associated with different CoAs. Consequently, as the mobile node performs a handoff from one network access node to another, the IP tunnel from the home agent may need to be reestablished each time the mobile node registers with a new foreign agent.

In some cases, a session may be active at the mobile node when it performs a handoff from one network access node to another. In such cases, packets sent to a CoA associated with a given network access node may not reach the mobile node after the mobile node establishes communication with a new network access node that is associated with a new CoA. Accordingly, there is a need to mitigate packet loss during communication handoffs.

SUMMARY

A summary of sample aspects of the disclosure follows. It should be understood that any reference to the term aspects herein may refer to one or more aspects of the disclosure.

The disclosure relates in some aspects to providing seamless mobile IP handoffs. For example, when a mobile node performs a handoff between access nodes that are associated with different routing nodes, all packet transfers between the initial routing node and the mobile node may not have completed before the handoff to the new access node and the new routing node. The following disclosure describes techniques for routing undelivered packets between the mobile node and the initial routing node to mitigate such packet loss.

The disclosure relates in some aspects to establishing a protocol tunnel (e.g., a link-layer tunnel) for routing packets between an access node and a mobile node during a communication handoff. For example, the mobile node may initially establish a wireless access link with a first access node that serves as a data attachment point for the mobile node. The first access node is associated with (e.g., on the same sub-network as) a first routing node (e.g., a first-hop router) that provides connectivity to a packet network. Here, the mobile node may establish a first route associated with the first access node for transferring packets between the first routing node and a first IP interface at the mobile node.

At some point in time, the mobile node may perform a handoff to a second access node that is associated with a second routing node. In this case, the second access node now becomes the serving node for the mobile node. The mobile node may thus establish a second route associated with the second access node for transferring packets between the second routing node and a second IP interface at the mobile node.

To prevent the loss of any packets that are still in route via the first route during the handoff, the mobile node establishes a protocol tunnel with the first access node via the second access node. On the forward-link, packets being delivered via the first route at the first access node are routed over the protocol tunnel to the second access node. The second access node delivers the tunneled packets to the mobile node via the second route. The mobile node then routes the packets received via the tunnel to the first route for delivery to the first IP interface. Similar complementary operations are performed for the reverse-link.

When the mobile node adds the second access node to its route set, the second access node advertises the identity of the second routing node (e.g., via an indication that identifies a new IP interface). As a result, the mobile node may present the new IP interface to its upper layer processing and trigger a move of the data attachment point for the mobile node to the second access node. In the event there is still data associated with the first routing node that is in transit to or from the mobile node, this leftover data may be sent over the protocol tunnel to route the data to the appropriate route and/or the appropriate IP interface. In this case, a single wireless access link between the mobile node and the second access node may concurrently carry multiple different logical access links associated with multiple IP interfaces.

BRIEF DESCRIPTION OF THE DRAWINGS

These and other sample aspects of the disclosure will be described in the detailed description and the appended claims that follow, and in the accompanying drawings, wherein:

Figure 1:
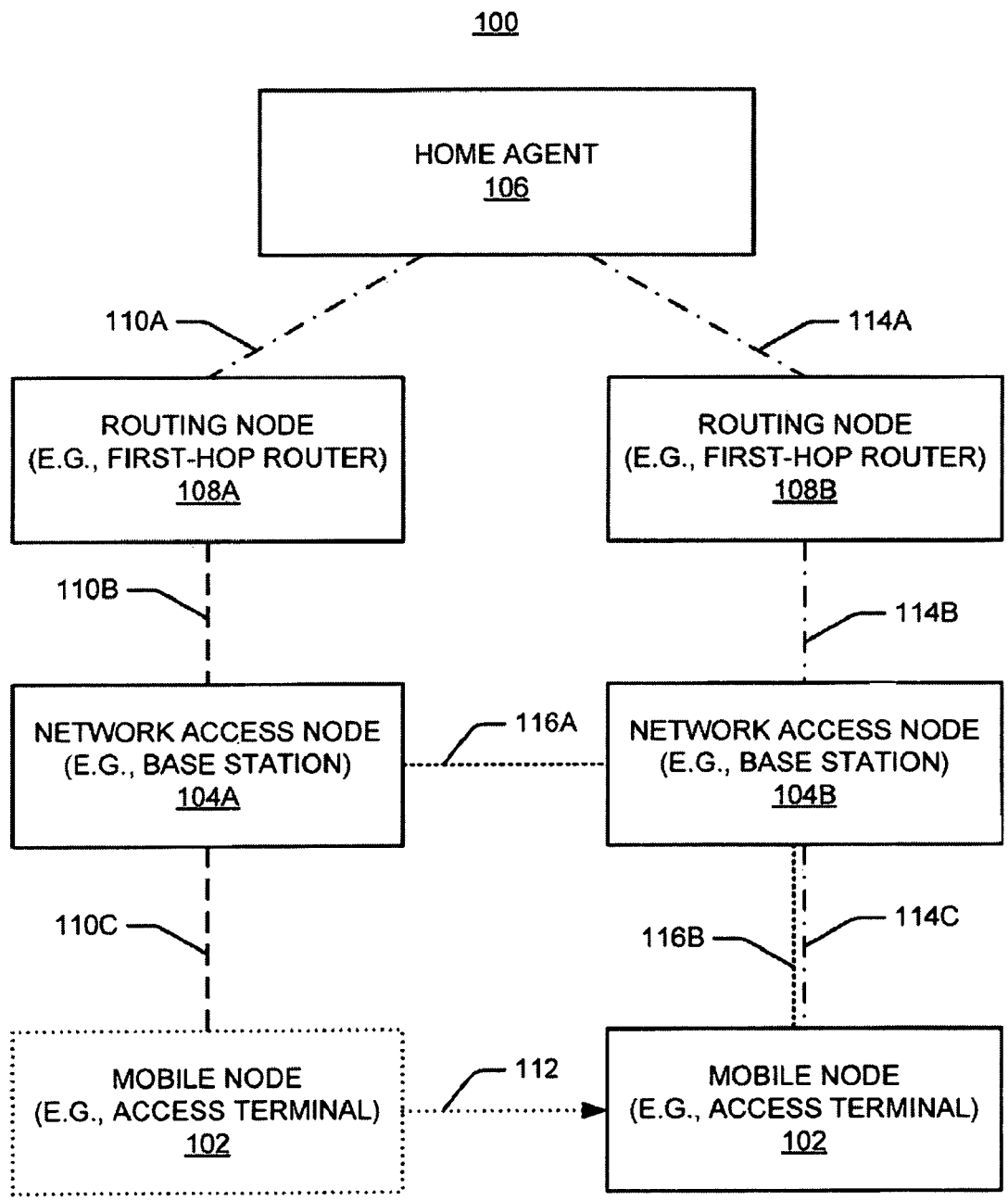
FIG. 1 is a simplified block diagram illustrating several aspects of a sample communication system that supports mobile nodes.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect described herein may comprise at least one element of a claim.

FIG. 1 illustrates a sample communication system 100 where a mobile node 102 (e.g., implemented as a wireless access terminal) may connect to network access nodes 104A and 104B and receive packets forwarded by a home agent 106. Here, the access nodes 104A and 104B may employ the same type of wireless link technology. The access node 104A is associated with a routing node 108A while the access node 104B is associated with a routing node 108B. To reduce the complexity of FIG. 1, only two access nodes and two routing nodes are shown. It should be appreciated, however, that such a communication system may include other access nodes that the mobile node 102 may connect to, as well as other routing nodes and other types of communication nodes.

As represented by the phantom box in FIG. 1, the mobile node 102 is initially connected to the access node 104A. Thus, the mobile node 102 may send/receive packets to/from the home agent 106 via a communication path represented by the dashed lines 110A, 10B, and 110C.

As represented by the dashed line 112, at some point in time the mobile node 102 moves closer to the access node 104B and performs a handoff procedure to connect to the access node 104B instead of the access node 104A. Once this handoff is complete, the mobile node 102 may send/receive packets to/from the home agent 106 via a communication path represented by the dashed lines 114A, 114B, and 114C.

In conjunction with this handoff, a protocol tunnel is established between the mobile node 102 and the access node 104A via the access node 104B as represented by the dashed lines 116A and 116B. This protocol tunnel facilitates packet transfer between the access node 104A and the mobile node 102 after the mobile node 102 connects to the access node 104B.

Sample operations of the system 100 will be described in more detail in conjunction with the flowchart of FIGS. 2A and 2B. For convenience, the operations of FIGS. 2A and 2B (or any other operations discussed or taught herein) may be described as being performed by specific components (e.g., components of the system 100). It should be appreciated, however, that these operations may be performed by other types of components and may be performed using a different number of components. It also should be appreciated that one or more of the operations described herein may not be employed in a given implementation.

Figure 2A:
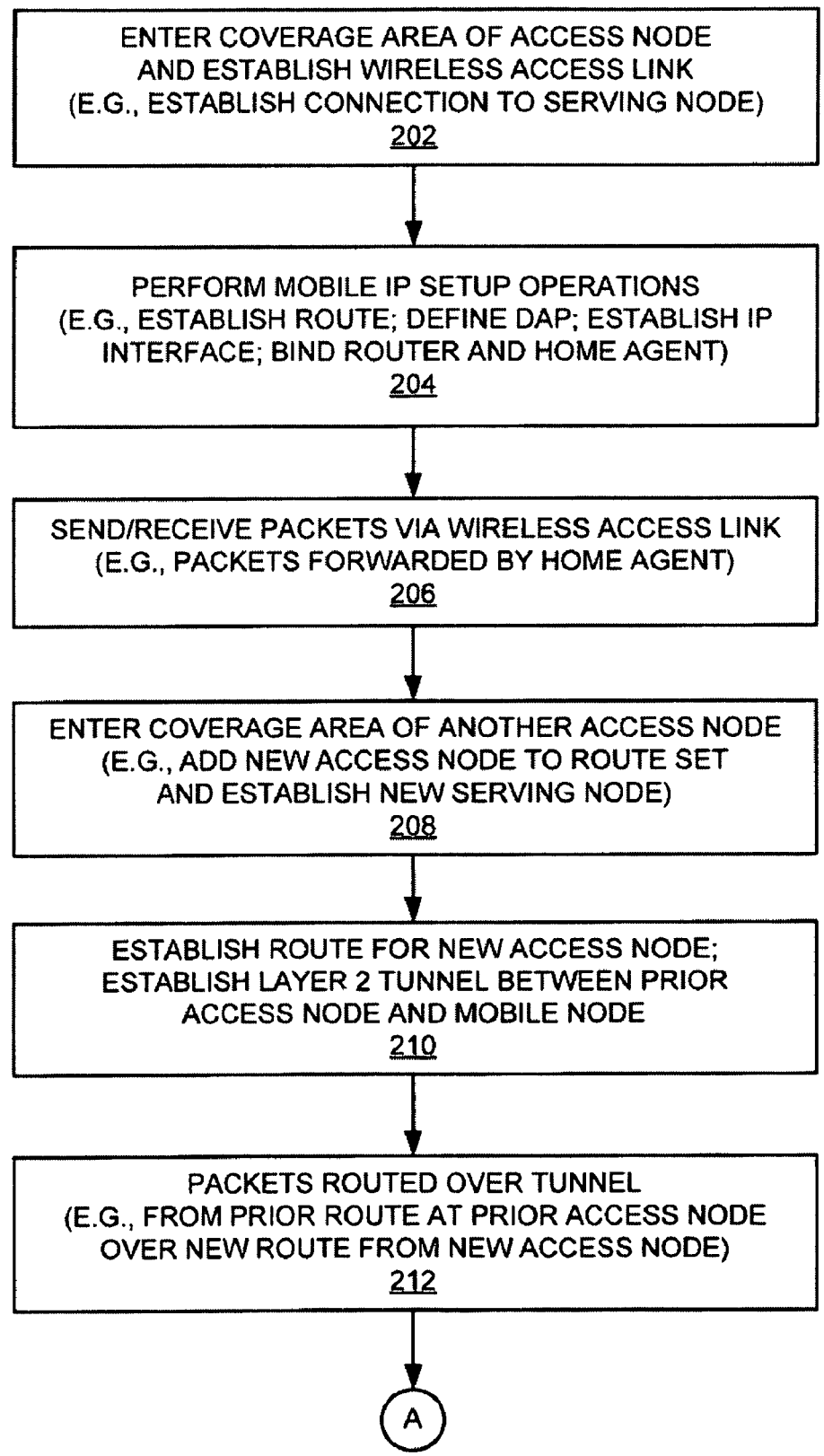
FIGS. 2A and 2B are a flowchart that illustrates several sample operations that may be performed to facilitate a seamless communication handoff.
Figure 2B:
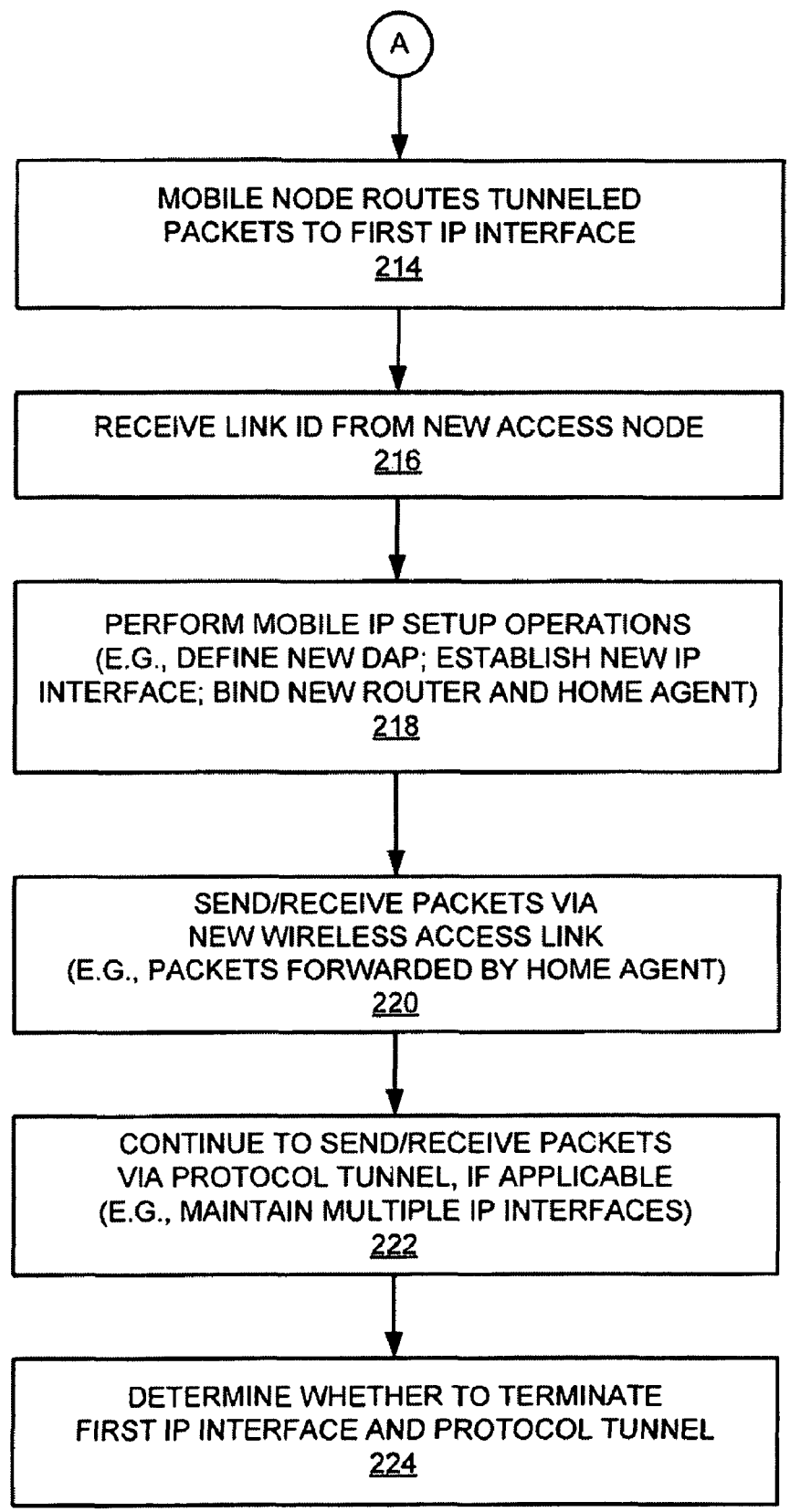

As represented by block 202 of FIG. 2A, at some point in time the mobile node 102 enters the coverage area of the access node 104A (e.g., a base station). The mobile node 102 elects to establish a wireless access link with the access node 104A, whereby the access node 104A is established as the serving node that provides network connectivity for the mobile node 102. In conjunction with these operations, the access node 104A advertises the identity of its first-hop router (e.g., by sending a LinkID associated with the routing node 108A to the mobile node 102). In the example of FIG. 1, the wireless access link between the access node 104A and the mobile node 102 is represented by the dashed line 110C.

The access node 104A is connected to a sub-network that is different than the home sub-network of the mobile node 102. Thus, the routing node 108A (e.g., a first-hop router) may serve as the foreign agent for the mobile node 102 while the mobile node is connected to the access node 104A (or any other access node associated with the routing node 108A).

As represented by block 204, the mobile node 102 performs various mobile IP-related setup operations in cooperation with the access node 104A, the routing node 108A, and the home agent 106. For example, a route may be established for sending/receiving packets to/from the access node 104A. In addition, the access node 104A may be selected as the data attachment point ("DAP") for the mobile node 102. Also, the mobile node 102 may establish an IP interface for packet traffic associated with the routing node 108A. The mobile node 102 also may cooperate with the routing node 108A and the home agent 106 to establish a binding between the home IP address of the mobile node 102 and the CoA of the routing node 108A. As a result of these operations, a protocol tunnel is established between the home agent 106 and the routing node 108A (represented by the dashed line 110A). In addition, a protocol tunnel is established between the routing node 108A and the access node 104A (represented by the dashed line 110B).

As represented by block 206, packets are transferred between the mobile node 102 and the routing node 108A via the first route. For example, for the forward-link the home agent 106 intercepts any packets sent to the home IP address of the mobile node 102 and forwards the packets over the tunnel 110A to the routing node 108A. The routing node 108A forwards the packets it receives over the tunnel 110B to the access node 104A. The access node 104A then sends the packets over the wireless link 110C to the mobile node 102 where the packets are terminated at the first IP interface.

As represented by block 208, at some point in time the mobile node 102 may determine that the access node 104B provides more desirable wireless service than the access node 104A. For example, the mobile node 102 may have recently entered the coverage area of the access node 104B. As a result, the mobile 102 may initiate a handoff by adding the access node 104B to its route set whereby the access node 104B is established as the serving node for the mobile node 102 in place of the access node 104A. A wireless access link (e.g., as represented by the line 114C) is thus established between the mobile node 102 and the access node 104B. A decision to initiate such a handoff may be based on various factors. For example, in some cases the mobile 102 may elect to perform a handoff based on the relative signal strength of pilot signals (e.g., beacons) or other signals transmitted by the access nodes 104A and 104B.

As represented by block 210, the mobile node 102 commences mobile IP-related setup operations for access node 104B. Here, a second route may be established to enable the mobile node 102 to send/receive packets to/from the access node 104B via the new wireless link 114C.

Also, to mitigate potential packet loss during the handoff, a protocol tunnel is established between the mobile node 102 and the access node 104A as represented by the dashed lines 116A and 116B. For example, the access node 104A may be configured to encapsulate packets (e.g., fragmented data packets or fully buffered packets) and send them to the access node 104B via a link 116A. The link 116A may comprise a backhaul connection or some other suitable communication link. In some aspects, the access node 104A encapsulates each of these encapsulated packets in a header that identifies the mobile node 102. When the access node 104B receives one of these packets, it removes this header and uses the second route to forward the encapsulated packets to the mobile node 102 via the tunnel 116B established between these nodes. That is, the encapsulated packets are sent over the wireless link 114C to the mobile node 102.

In a typical case the protocol tunnel may comprise a link-layer (e.g., layer 2) tunnel. It should be appreciated, however, that such a tunnel may be implemented in other ways.

As represented by block 212, the access node 104A and the mobile node 102 may exchange packets over the protocol tunnel while the mobile node 102 establishes the routing node 108B as its new foreign agent. As mentioned above, packets associated with the first route may have been forwarded by the home agent 106 to the routing node 108A, but not sent from the access node 104A to the mobile node 102 before the access node 104B became the new serving node for the mobile node 102. Consequently, the access node 104A may encapsulate these packets, designate the mobile node 102 as the destination (e.g., as indicated by a second route header), and send the encapsulated packets to the access node 104B. As these packets will be received as layer 2 packets, the access node 104B will forward the packets to the specified destination via the wireless link 114C (e.g., as indicated by the second route).

As represented by block 214, the mobile node 102 receives the tunneled packets via the second route and, after removing the layer 2 packet information, determines that the packets are associated with the first route. The mobile node 102 may therefore send the packets to the protocol stack of the first route for processing, after which the packets are provided to the first IP interface. These operations are described in more detail below in conjunction with FIG. 3.

As represented by block 216, at some point during the handoff operation the mobile node 102 receives an indication from the access node 104B that identifies the routing node 108B. For example, in some cases the indication may comprise the IP address of the routing node 108B. Based on this indication, the mobile node 102 may determine that the access node 104B is associated with a different routing node (e.g., first-hop router) than the access node 104A.

Accordingly, as represented by block 218, the mobile node 102 performs mobile IP-related operations to establish the routing node 108B as its foreign agent. These operations may include, for example, establishing the access node 104B as the DAP for the mobile node 102. In addition, the mobile node 102 may establish a second IP interface for traffic handled by the routing node 108B. The mobile node 102 may then cooperate with the routing node 108B and the home agent 106 to establish a binding between the home IP address of the mobile node 102 and the CoA of the routing node 108B. As a result of these operations, a protocol tunnel (represented by the dashed line 114A) is established between the home agent 106 and the routing node 108B. In addition, a protocol tunnel (represented by the dashed line 114B) is established between the routing node 108B and the access node 104B.

As represented by block 220, the mobile node 102 may then send/receive packets to/from the routing node 108B via the second route. For forward-link traffic, the home agent 106 again intercepts any packets sent to the home IP address of the mobile node. In this case, however, the home agent 106 forwards the packets over the tunnel 114A to the routing node 108B. The routing node 108B then forwards the packets over the tunnel 114B to the access node 104B. The access node 104B sends the packets over the wireless link 114C to the mobile node 102 where the packets are terminated at the second IP interface. Complementary operations are performed for reverse-link traffic.

As represented by block 222, the first IP interface and the protocol tunnel between the access node 104A and the mobile node 102 may be maintained after the routing node 108B is established as the foreign agent for the mobile node 102. Consequently, in the event there are any leftover packets associated with the first route, the these packets may be routed via the protocol tunnel from the access node 104A to the mobile node 102 or vice versa, thereby mitigating packet loss or interruption of this packet flow.

As represented by block 224, the first IP interface and the protocol tunnel may be maintained until the mobile node 102 determines that they are no longer needed. For example, in some cases the mobile node 102 may elect to terminate these communication entities if it determines that there are no more packets en route on the communication path between the routing node 108A and the access node 104A. In some cases the mobile node 102 may elect to terminate these communication entities if the access node 104A is removed from a list of active access nodes (e.g., a route set) maintained by the mobile node 102. In some cases these communication entities may be terminated based on other criteria (e.g., at the end of a defined lifetime for a tunnel or some other entity).

The teachings herein may be applicable to a variety of communication systems. For example, the techniques described herein may be implemented in an Ultra Mobile Broadband-based ("UMB-based") system, a Long Term Evolution-based ("LTE-based") system, or some other type of communication system. For illustrations purposes, several sample implementation details will now be described in the context of the UMB-based communication system 300 depicted in FIG. 3. It should be appreciated that some or all of the components and/or operations discussed below may be incorporated into other types of communication systems.

Figure 3:
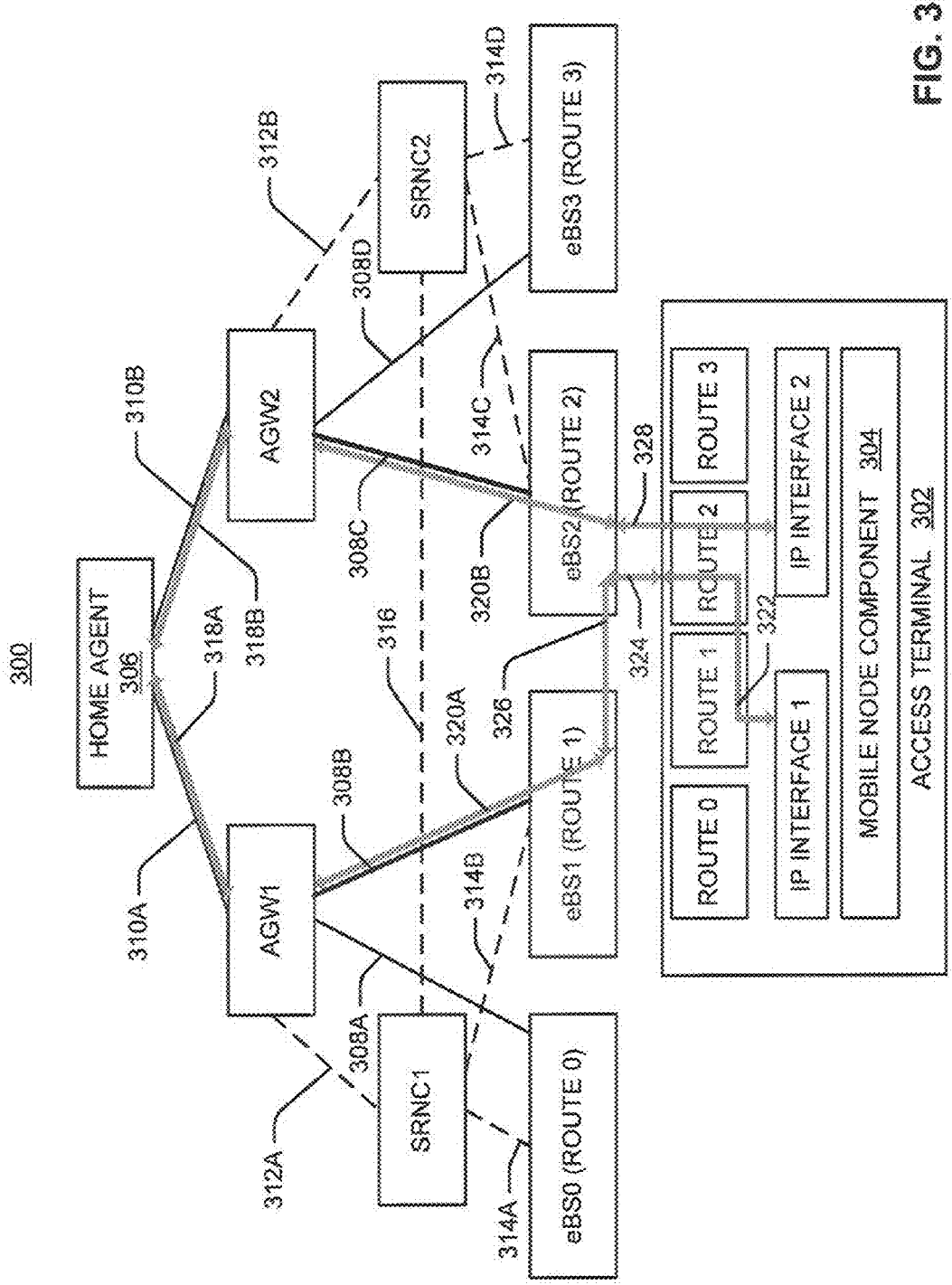
FIG. 3 is a simplified block diagram illustrating several aspects of a sample communication system that supports mobile nodes such as an ultra mobile broadband-based communication system.

In FIG. 3, an access terminal 302 includes a mobile node component 304 to provide mobile IP data connectivity for a user. The access terminal 302 may communicate with any one of a set of evolved base stations eBS0, eBS1, eBS2, and eBS3 (e.g., network access nodes) distributed throughout the communication system 300. Each of the evolved base stations is connected over its respective backhaul to an access gateway ("AGW").

In the example of FIG. 3, eBS0 and eBS1 are associated with an access gateway AGW1. Here, eBS0 and eBS1 communicate with AGW1 via communication links that are represented by the lines 308A and 308B, respectively.

Similarly, eBS2 and eBS3 are associated with an access gateway AGW2. Thus, eBS2 and eBS3 communicate with AGW2 via communication links that are represented by the lines 308C and 308D, respectively, in FIG. 3.

In some aspects, an access gateway provides a point of connectivity for an access terminal to a packet network (e.g., a layer 3 attachment point). For example, an access gateway may serve as the first-hop router for an access terminal. In this case, the packets are routed between the access gateway and the access terminal via an evolved base station that is the current serving access node for the access terminal. Here, the access gateway establishes a PMIP binding with the evolved base station that is assigned the DAP function for the access terminal and sends the packets to that DAP. The DAP then sends the packets to access terminal via the serving node (which may be the same evolved base station as the DAP).

The access gateways communicate with a home agent 306 via appropriate communication paths over the packet network. For convenience these communication paths are simply represented by the lines 310A and 310B, respectively, in FIG. 3.

The system 300 employs a relatively flat, meshed architecture where the processing load may be distributed among the nodes of the system 300. For example, rather than employ centralized base station controllers, similar functionality may be implemented in one or more of the evolved base stations. Here, in some aspects an evolved base station may provide conventional base station functionality, base station controller functionality, and packet-data serving node functionality. In some aspects an evolved base station may include IP functionality that facilitates handoffs between the evolved base stations. In some aspects an evolved base station may provide forward-link serving eBS ("FLSE") functionality and reverse-link serving eBS ("RLSE") functionality. As mentioned above, in some aspects an evolved base station may provide data attachment point functionality (e.g., layer 2). For example, a single evolved base station may be designated for receiving all of the data packets destined for a given access terminal from a given access gateway.

The system 300 also includes session reference network controllers SRNC1 and SRNC2. In some aspects an SRNC may serve as a session anchor that stores session information for an access terminal and provide a route to the access terminal for other nodes. In some aspects an SRNC may perform authentication operations to enable the access terminal to gain access to the packet network. In practice, the functionally of an SRNC may be implemented as a standalone component, implemented in one or more of the eBSs, or implemented in some other node.

In the example of FIG. 3, each SRNC manages sessions and other functionality for a set of nodes (e.g., a sub-network). For example, SRNC1 may provide session management for nodes communicating with AGW1 and SRNC2 may provide session management for nodes communicating with AGW2. To this end, SRNC1 is configured to communicate via signaling with AGW1 as represented by the dashed line 312A and with eBS0 and eBS1 as represented by the dashed lines 314A and 314B, respectively. Similarly, SRNC2 is configured to communicate via signaling with AGW2 as represented by the dashed line 312B and with eBS2 and eBS3 as represented by the dashed lines 314C and 314D, respectively. In addition, SRNC1 and SRNC2 may communicate via signaling with one another as represented by the dashed line 316.

As discussed above, the access terminal 302 may independently establish a unique route to communicate with each base station. In some aspects a route may comprise an air-interface protocol stack. For example, a route may comprise a set of information relating to protocols, negotiation, configuration, and state for the association between the access terminal 302 and the corresponding base station. The access terminal 302 may maintain a route set indicative of all of the enhanced base stations that have a route with the access terminal. In the example of FIG. 3, the route set for the access terminal 302 may include a route 0 for communicating with AGW1 via eBS0, a route 1 for communicating with AGW1 via eBS1, a route 2 for communicating with AGW2 via eBS2, and a route 3 for communicating with AGW2 via eBS3.

As the access terminal 302 moves through a given geographical area, it may connect to a different evolved base station (hereafter referred to for convenience as an "eBS"). For example, the access terminal 302 may initially connect to eBS0, then connect to eBS1, and then connect to eBS2. When the access terminal 302 is in active session it may add a new eBS to its route set as it moves or as channel conditions change.

In an intra-AGW handoff (e.g., a handoff from eBS0 to eBS1), the new eBS is able to connect to the existing AGW (e.g., AGW1). Consequently, during the handoff the AGW may forward any undelivered forward-link packets to the new eBS for delivery to the access terminal 302. Similarly, on the reverse-link the new eBS may forward any packets from the access terminal 302 to the AGW during the handoff. Also, during an intra-AGW handoff, link-layer tunnels and/or IP tunnels may be employed between access nodes.

In an inter-AGW handoff (e.g., a handoff from eBS1 to eBS2), however, the new eBS may not be able to connect to the existing AGW. Moreover, forward-link IP packets from different AGWs could have different CoAs in this case. Consequently, to prevent delivering IP packets to the wrong IP interface at the access terminal 302, the current DAP would not send (e.g., via a layer 3 tunnel) IP packets to an FLSE that is associated with a different AGW (e.g., as indicated by an associated link ID). Similarly, to prevent improper routing of packets on the reverse-link, the access terminal 302 would not send IP packets associated with one interface (e.g., IP interface 1 in FIG. 3) on a different IP interface (e.g., IP interface 2). Thus, during an inter-AGW handoff, IP tunneling is not allowed between access nodes but link-layer tunneling is allowed.

In some aspects, the tunneling techniques described herein solve the above problems by providing a link-layer route for packet transfer between the prior eBS (e.g., eBS1) and the access terminal 302 during an inter-AGW handoff. For the forward-link, when an eBS becomes an FLSE, the eBS sends an IPT-Notification message to each access network route instances ("ANRI") in the route set. As this message may include the link ID of the FLSE, a DAP or the previous FLSE may determine whether to tunnel IP packets to the new FLSE using an IP tunnel (intra-AGW handoff) or a link-layer tunnel (inter-AGW handoff). In some aspects, such a determination may be made due to the correlation between a given route, a given IP interface, and a given link ID. For the reverse-link, when an eBS becomes a DAP, it sends an IPT-Notification message to all ANRIs in the route set. As this message may include the DAP record which has the AGW address with which the DAP connects as well as the GRE key of the DAP, an eBS may determine how to tunnel IP packets through the DAP on the reverse-link. Again, the eBS may properly determine how to handle the tunneled packet as a result of the correlation between the route, the IP interface, and the link ID.

On the forward-link, the current DAP (e.g., eBS1) may encapsulate IP packets using its own route (e.g., route 1) and then use a link-layer tunnel to send the packets to the new FLSE. After the tunneled packets are extracted at the access terminal 302, the IP packets will terminate on the correct IP interface (e.g., IP interface 1). Similarly, on the reverse-link, the link-layer tunneling is used to deliver IP packets associated with the prior IP interface (e.g., IP interface 1) to the AGW (e.g., AGW1) that is associated with the CoA for those packets.

In parallel with above tunneling operations, the access terminal 302 will try to retrieve a CoA for IP interface 2 when eBS2 is added in the route set. The message used to retrieve the IP CoA for IP interface 2 (e.g., an agent solicitation message) will be sent on IP interface 2 using route 2 (which is the current RLSE). Here, when the access terminal 302 receives the link ID associated with AGW2 that is advertised by eBS2, the access terminal 302 will present a new IP interface to the upper layer which will trigger the DAP being moved to eBS2 and a PMIP tunnel being established between eBS2 and the new AGW (AGW2). A new IP address will then be assigned to the access terminal 302 through the newly established PMIP tunnel with AGW2. A client MIP binding also may be performed between AGW2 and the home agent 306.

Throughout the above call flow there is no interruption to user traffic when eBS2 becomes the FLSE because IP packets arriving at eBS1 on the forward-link are encapsulated in the RLP of eBS1 and tunneled to the access terminal 302 through eBS2 via the link-layer tunnel. On the reverse-link, the access terminal 302 does not send packets with an IP address belonging to AGW1 through the standard eBS2 route 2 because the link ID of eBS2 is different the link ID of eBS1. Instead, when eBS2 is the RLSE, the access terminal 302 encapsulates these IP packets in the RLP of eBS1 and link-layer tunnels the packets through eBS2 to eBS1.

The access terminal 302 may concurrently maintain both IP interfaces (IP addresses) so that it may continue to send/receive data to/from both IP interfaces during the entire inter-AGW handoff period. In some implementations, the access terminal terminates an IP interface only after all eBSs associated with that IP interface are dropped from the route set. Similarly, the PMIP tunnel from the previous DAP (eBS1) to the previous AGW (AGW1) may be maintained until that PMIP lifetime expires or the previous DAP is removed from the route set. Thus, this scheme provides a "make-before-break" inter-AGW handoff process which mitigates the possibility of any data interruption during the handoff.

Sample implementation details relating to inter-AGW handoff that may be performed by the system 300 will be described in conjunction with the call flow diagrams of FIGS. 4A-4D. In the scenario that follows, AGW1 is associated with a first link ID (LinkID1), AGW2 is associated with a second link ID (LinkID2), and mobile IP (e.g., MIPv4 or MIPv6) is used for the inter-AGW handoff. The call flows of FIGS. 4A-4D will be discussed sequentially, beginning with the call flow at the top of FIG. 4A.

Initially, the access terminal 302 (hereafter, "AT") is served by eBS1 whereby eBS1 is the DAP, FLSE, and RLSE for the AT. SRNC1 manages the session for eBS1. The current MIP binding uses IP interface 1. Thus, the AT sends/receives packets (e.g., IPv4 packets) to/from the home agent 306 (hereafter, "HA") through a MIP tunnel 318A (e.g., a MIPv4 tunnel) between the HA and AGW1 and a PMIP tunnel 320A between AGW1 and eBS1. For example, on the forward link the HA redirects intercepted packets to AGW1 via the tunnel 318A and AGW1 forwards these packets to eBS1 via the PMIP tunnel 320A. The base station eBS1 uses route 1 to send the packets over the wireless access link 402 (not shown in FIG. 3) to the AT whereby the packets terminate at IP interface 1. For the reverse link, when the application in the AT generates data, the mobile node component 304 sends the resulting packets to IP interface 1 associated with LinkID1. The AT could use any stack associated with LinkID1 (e.g., route 0 or route 1). Route 1 is used in this example. The base station eBS1 receives the route 1 packets via the wireless link 402 and sends them over the PMIP tunnel 320A to AGW1. AGW1 then forwards the packets to the HA via the tunnel 318A or to the specified destination via AGW1's packet network connection.

At some point in time, the AT detects pilot signals from eBS2 and due to radio conditions or some other criterion, the FLSE and RLSE for the AT may be switched to eBS2 (It should be appreciated, however, that the FLSE and the RLSE may be implemented in different eBSs in some cases). Here, the AT adds eBS2 to its route set by tunneling a Route Open Request message to eBS2 as indicated in FIG. 4A.

Figure 4A:
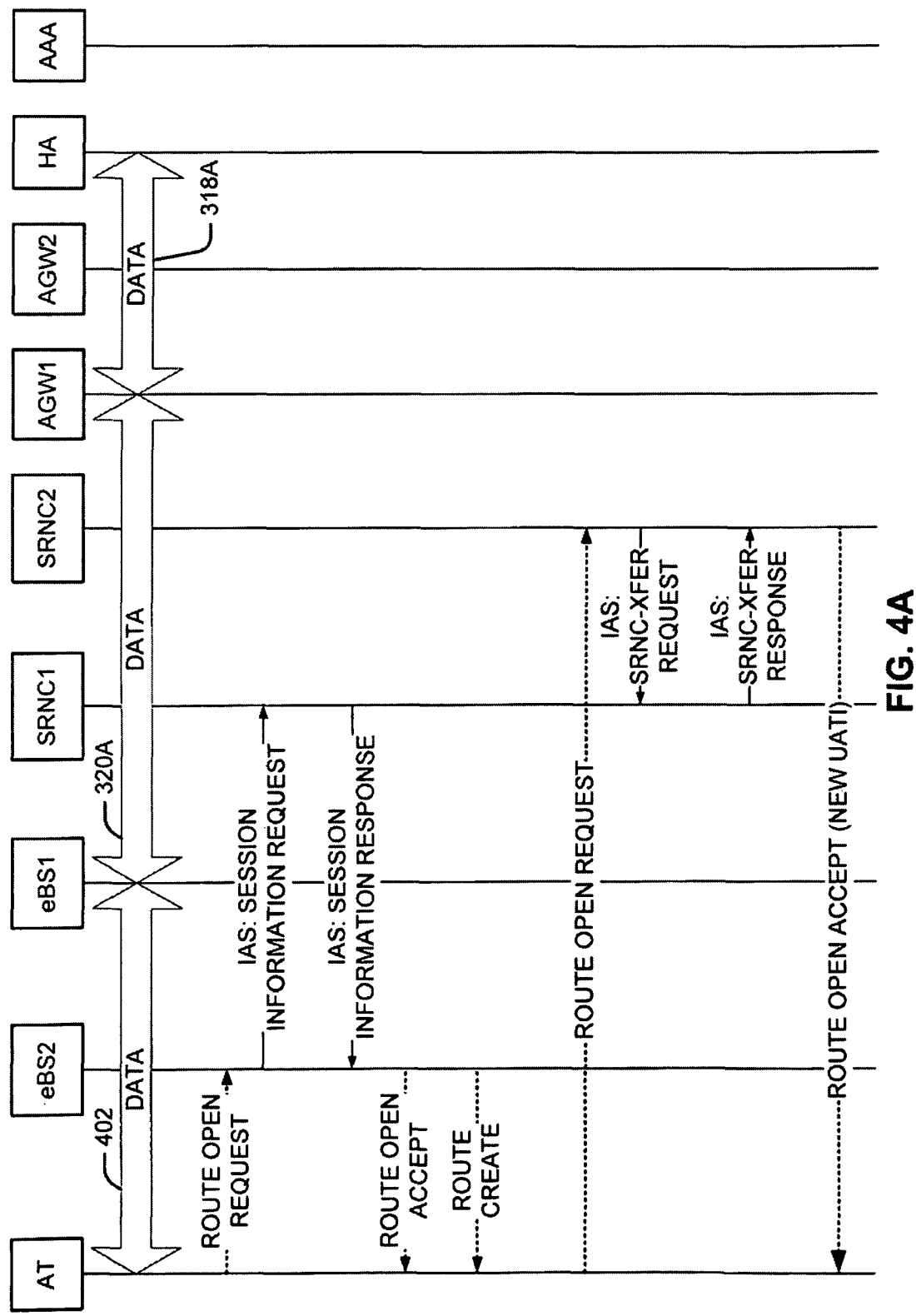
FIGS. 4A, 4B, 4C, and 4D are a call flow diagram that illustrates several sample call flow operations that may be performed by a communication system such as the system of FIG. 3.
Figure 4B:
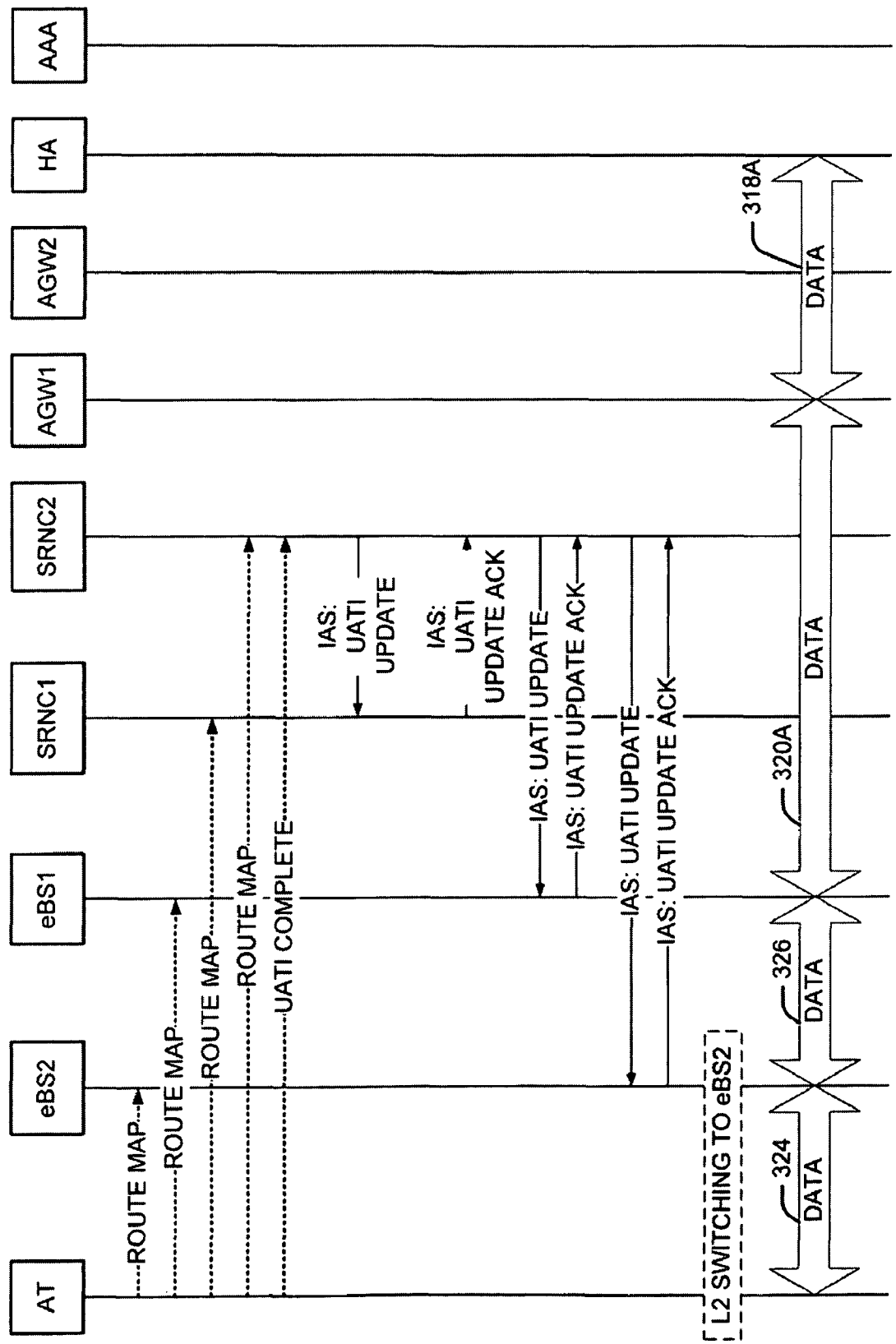

The AT thus commences session transfer operations as described at FIGS. 4A and 4B. Here, eBS2 sends an inter-ANRI signaling ("IAS") message that requests session information of the AT from the current SRNC (SRNC1).

SRNC1 sends a Session Information Response message back to eBS2. This message includes the information record of the current AGW (AGW1).

The base station eBS2 then sends a Route Open Accept message to the AT to complete the route setup procedure.

The base station eBS2 also sends a Route Create message to the AT to create a route for the target SRNC (SRNC2). This message includes the access network identifier ("ANID") of SRNC2.

Upon receipt of the Route Create message, the AT tunnels a Route Open Request message to SRNC2. SRNC2 then triggers an SRNC transfer from SRNC1 by sending an SRNC Transfer Request to SRNC1. Upon receipt of the SRNC Transfer Request message, SRNC1 accepts the SRNC transfer by sending an SRNC Transfer Response message to SRNC2.

SRNC2 completes the route setup procedure by sending a Route Open Accept message to the AT. This message contains a new unicast access terminal identifier ("UATI") assigned by SRNC2 for the AT. The AT has thus established its route to SRNC2 at this point.

Referring now to FIG. 4B, upon establishing the new route, the AT sends a new Route Map message to each ANRI in the route set. Thus, in this example, the AT provides its route set information to eBS2, eBS1, SRNC1, and SRNC2.

In conjunction with the assignment of the new UATI, the AT changes the session anchor route to the route corresponding to SRNC2 and sends a UATI Complete message to SRNC2.

Upon receipt of the UATI Complete message, SRNC2 sends a UATI Update message to the other ANRIs in the route set (e.g., eBS2, eBS1, and SRNC1) to inform these nodes that SRNC2 is the new session anchor. Each of these ANRIs then sends an acknowledgment message back to SRNC2. In addition, SRNC1 may close its route with the AT.

As indicated in FIG. 4B, the AT may perform link-layer ("L2") fast switching to eBS2. Thus, the link-layer tunnel between eBS1 and the AT may be used for transferring packets.

On the reverse-link, the AT uses IP interface 1 and sends packets via route 1. Here, the packets are processed using standard operations for sending the packets over the air. Since eBS1 is not the RLSE, the packets are sent to the Inter-Route Tunneling Protocol ("IRTP") in route 2 (as represented by a portion of the line 322 in FIG. 3). The packets are thus sent through the layer 2 tunnel to eBS2 (represented by the line 324 in FIGS. 3 and 4B). The base station eBS2 then performs radio link protocol ("RLP") processing and sends the packets to eBS1 via the layer 2 tunnel from eBS2 to eBS1 (represented by the line 326). Next, eBS1 processes the packets and sends them to AGW1 via the PMIP tunnel 320A. As mentioned above, AGW1 may then send the packets to the HA via the tunnel 318A or send the packets to the specified destination via the packet network in some other manner.

On the forward-link, AGW1 receives packets destined for the AT from the HA via the tunnel 318A. The base station eBS1 receives these packets from AGW1 via the tunnel 320A. As the FLSE for the AT is eBS2 under AGW2, eBS1 will use its route (route 1) when it sends the packets to eBS2 via the tunnel 326. The packets are transmitted from eBS2 to the AT via the tunnel 324 using route 2. The AT will then perform RLP processing on the packets received on route 2 and send the packets to route 1 IRTP protocol so that the packets are processed on the appropriate IP interface (IP interface 1).

The above tunneling operations may continue as long as eBS2 is the RLSE for the AT and eBS1 is the DAP for the AT.

Figure 4C:
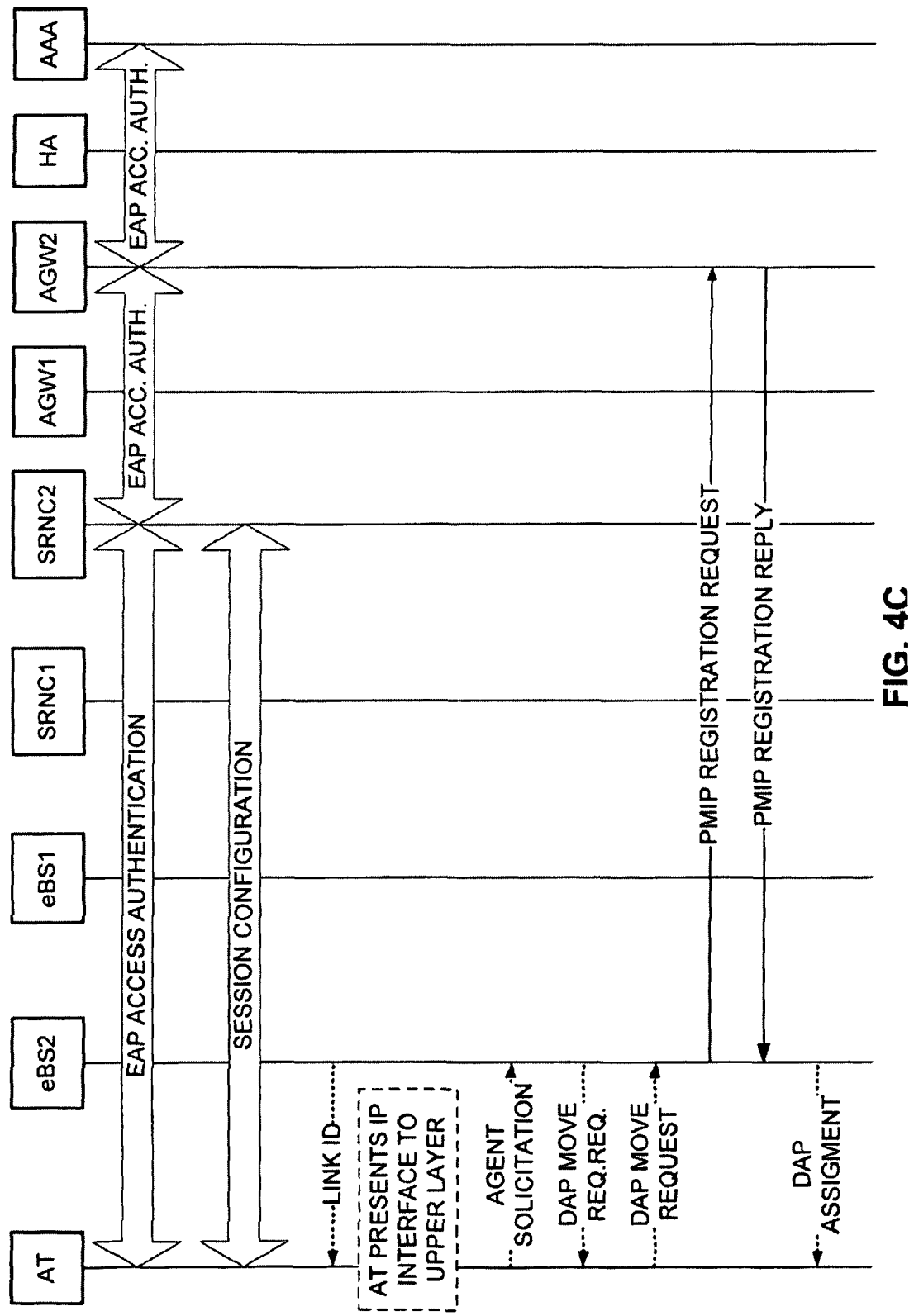

Referring now to FIG. 4C, SRNC2 triggers extensible authentication protocol ("EAP") access authentication and authorization for the AT. To this end, authentication, authorization and accounting functions ("AAA") may be accessed to manage the use of network resources by the AT through AGW2.

SRNC2 then performs session configuration with the AT. For example, SRNC2 may send session information via IOS signaling whereby the ID of AGW2, the user's permanent network access identifier ("NAI"), and a proxy mobile node-home agent ("PMN-HA") key are provided to eBS2. After the session configuration is completed, all ANRIs in the route set retrieve a copy of the session as well as the information records of the current AGW (AGW1) and the new AGW (AGW2).

Upon receiving new session information with the new AGW information records, eBS2 assigns the link ID to the AT. Here, the link ID may represent the IP interface (e.g., the IP address of AGW2) that is the AT uses to communicate at the IP layer.

The AT thus presents the received link ID to the upper IP layer. The upper IP layer then compares the received link ID with its current link ID. Since the received link ID is different than the current link ID in this example, the AT triggers IP address assignment operations.

The AT also may send an Agent Solicitation to eBS2 at this time.

Since eBS2 is not associated with AGW1, eBS2 is established as the DAP for the AT to provide a DAP under AGW2. In some aspects, this process may be initiated by the AT or eBS2. As an example of the former case, the AT may send a DAP Move Request message to eBS2 once it determines that eBS2 is associated with a different AGW than the AGW associated with the prior serving eBS (eBS1). As an example of the latter case (i.e., an AT-assisted DAP handoff), if eBS2 receives data from AT route 2 (IP interface 2) and has not yet received a DAP Move Request message from the AT, eBS2 sends a DAP Move Request Request to trigger the AT to send the DAP Move Request.

Since eBS2 may not have a GRE key associated with AGW2 at this point, eBS2 may send a PMIP Registration Request to perform PMIP binding at AGW2. This request may include the permanent NAI and eBS2 IP address obtained as discussed above. In addition, this request may include a mobile node-home agent ("MN-HA") authentication extension calculated by using the PMN-HA key obtained as discussed above. In some aspects, the AT may establish the PMIP tunnel to AGW2 when the AT first receives an IP packet from route 2.

AGW2 accepts the binding request by sending a PMIP Registration Reply to eBS2. Here, AGW2 may select a GRE key 2 associated with the permanent NAI and includes it through GRE extension in the PMIP registration reply.

In an AT-assisted DAP handoff, eBS2 sends a DAP Assignment message to the AT after receiving the PMIP registration reply message.

Figure 4D:
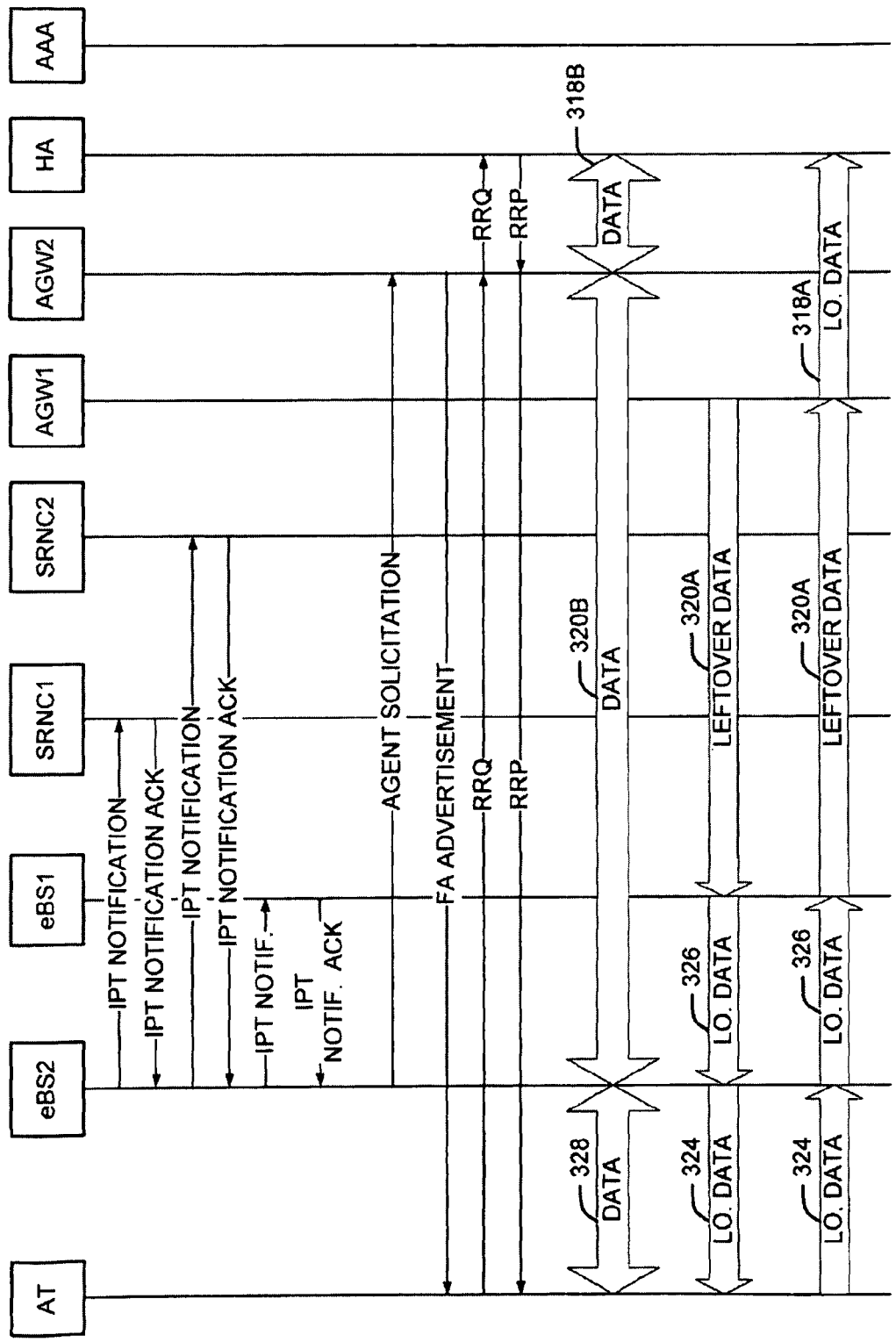

Referring to FIG. 4D, upon receipt of a successful PMIP registration reply message from AGW2, eBS2 becomes the AT's DAP for AGW2. In addition, eBS2 sends an Internet Protocol tunneling ("IPT") Notification message containing the DAP record of AGW2 to the other ANRIs in the route set. In this way, eBS2 informs the other nodes that it is the new DAP for the AT. Here, eBS2 may provide the IP address of AGW2 and the GRE key to other route set members through IOS signaling The other ANRIs may then respond with IPT Notification Acknowledgement messages as shown in FIG. 4D. In addition, eBS1 may remove its route with the AT and may terminate its PMIP tunnel with AGW1 at this time (e.g., provided there are no more packets to be sent to or received from the AT via this route).

Upon presenting the new IP interface as described above, the AT may request new IP address assignment and new mobile IP registration. Thus, the AT will commence acquiring a new CoA and binding the new AGW to the HA.

As shown in FIG. 4D, eBS2 forwards the Agent Solicitation to AGW2. AGW2 then sends a Foreign Agent advertisement message that includes a new foreign agent CoA to the AT.

The AT sends an RRQ message to AGW2 and AGW2 forwards it the HA to bind the AT's home IP address ("HoA") with the CoA. The HA then sends an RRP message back to the AT through AGW2.

At this point, eBS2 is the DAP for the AT under AGW2 and packet data on both the forward-link and the reverse-link is exchanged through eBS2 between the AT and AGW2. After the mobile IP binding update is received, the HA starts sending data to AGW2 via the MIP tunnel 318B. Packets are transferred between AGW2 and eBS2 via the PMIP tunnel 320B. In addition, eBS2 will use route 2 to transfer packets over-the-air between eBS2 and the AT via the link 328. After receiving the packets, the AT will use the IP interface associated with route 2 (i.e., IP interface 2) to process the packets as indicated in FIG. 3.

For a period of time there also may be leftover packet data associated with AGW1 being routed through the system. For example, on the forward link there may be leftover data traveling from AGW1 to the AT through the tunnel 320A between AGW1 and the source DAP (eBS1) and through the layer 2 tunnel 326 between eBS1 and eBS2. The base station eBS2 will use route 2 to send this data to the AT via tunnel 324 and the AT will provide this data to IP interface 1 as discussed above. Similarly, on the reverse link there may be leftover data traveling from IP interface 1 of the AT to the HA via the path through link 324, the layer 2 tunnel 326, the tunnel 320A, and the MIP tunnel 318A. Thus, during this period of time the HA may be receiving the data from both AGW1 and AGW2.

Figure 5:
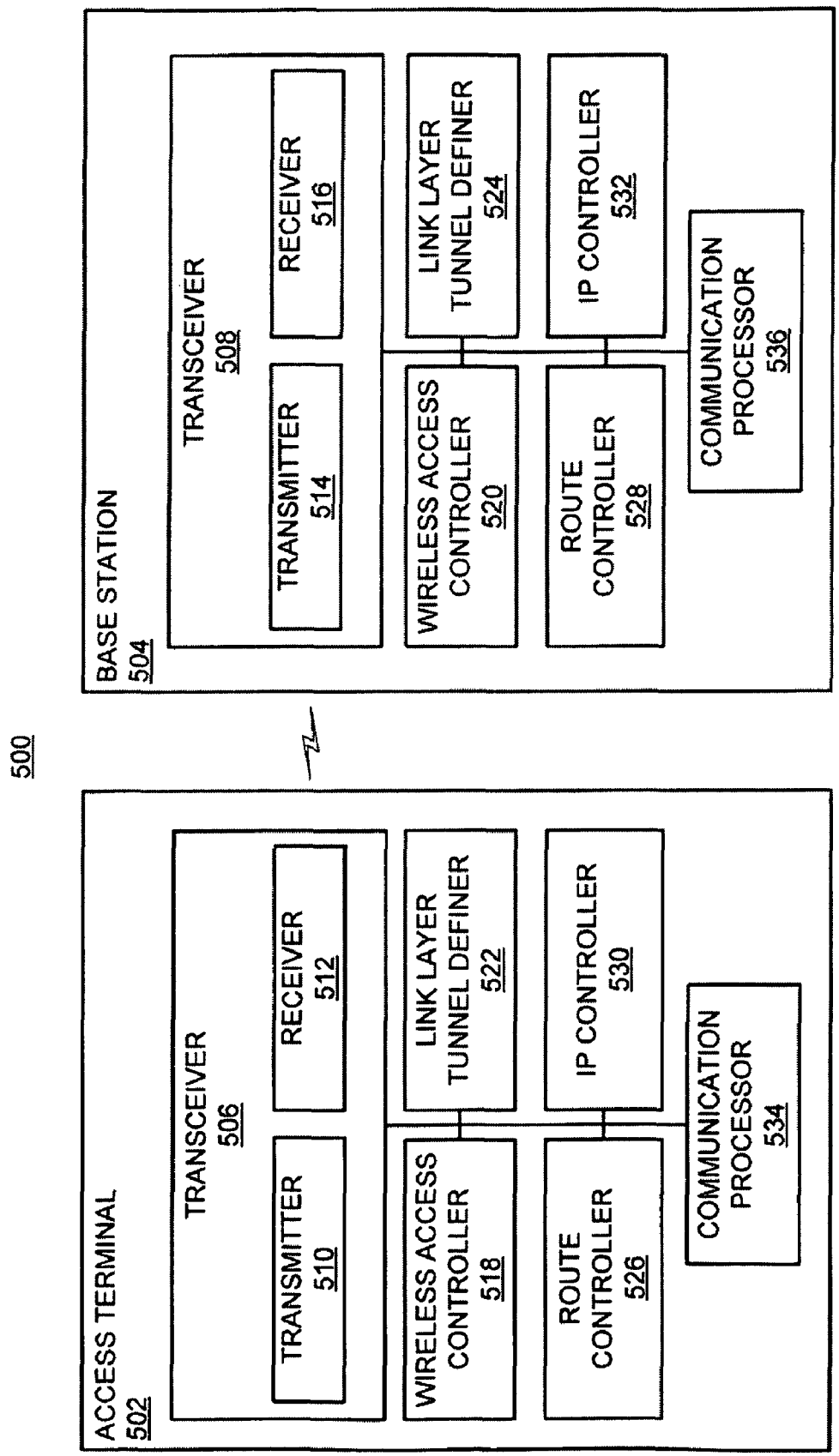
FIG. 5 is a simplified block diagram illustration several sample components of communication nodes.

The functionality described herein may be implemented in various ways. FIG. 5 illustrates several sample components that may be incorporated into an access terminal 502 and a base station 504 in accordance with the teachings herein. The access terminal 502 and the base station 504 include transceivers 506 and 508, respectively, for communicating with each other and with other nodes. The transceiver 506 includes a transmitter 510 for transmitting wireless signals and a receiver 512 for receiving wireless signals. The transceiver 508 includes a transmitter 514 for transmitting wireless signals and a receiver 516 for receiving wireless signals. The access terminal 502 and the base station 504 may include a wireless access controller 518 or 520, respectively, for controlling wireless access operations during inter-first-hop router handoffs and for providing other related functionality as taught herein. The access terminal 502 and the base station 504 may include a link-layer tunnel definer 522 or 524, respectively, to provide protocol tunnels during inter-first-hop router handoffs and for providing other related functionality as taught herein. The access terminal 502 and the base station 504 may include a route controller 526 or 528, respectively, for establishing and using routes during inter-first-hop router handoffs and for providing other related functionality as taught herein. The access terminal 502 and the base station 504 may include an IP controller 530 or 532, respectively, for controlling IP operations (e.g., initiating, maintaining, and terminating IP interfaces) during inter-first-hop router handoffs and for providing other related functionality as taught herein. The access terminal 502 and the base station 504 also may include a communication processor 534 or 536, respectively, for processing packets (e.g., received packets) during inter-first-hop router handoffs and for providing other related functionality as taught herein.

A wireless communication system as taught herein may be deployed to provide various types of communication content such as voice, data, and other content. Such a system may comprise multiple-access systems capable of supporting communication with multiple users by sharing the available system resources (e.g., bandwidth and transmit power). Examples of such multiple-access systems include code division multiple access ("CDMA") systems, time division multiple access ("TDMA") systems, frequency division multiple access ("FDMA") systems, 3GPP LTE systems, orthogonal frequency division multiple access ("OFDMA") systems, among others.

A wireless multiple-access communication system may simultaneously support communication for multiple wireless terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out, or a multiple-in-multiple-out ("MIMO") system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 6:
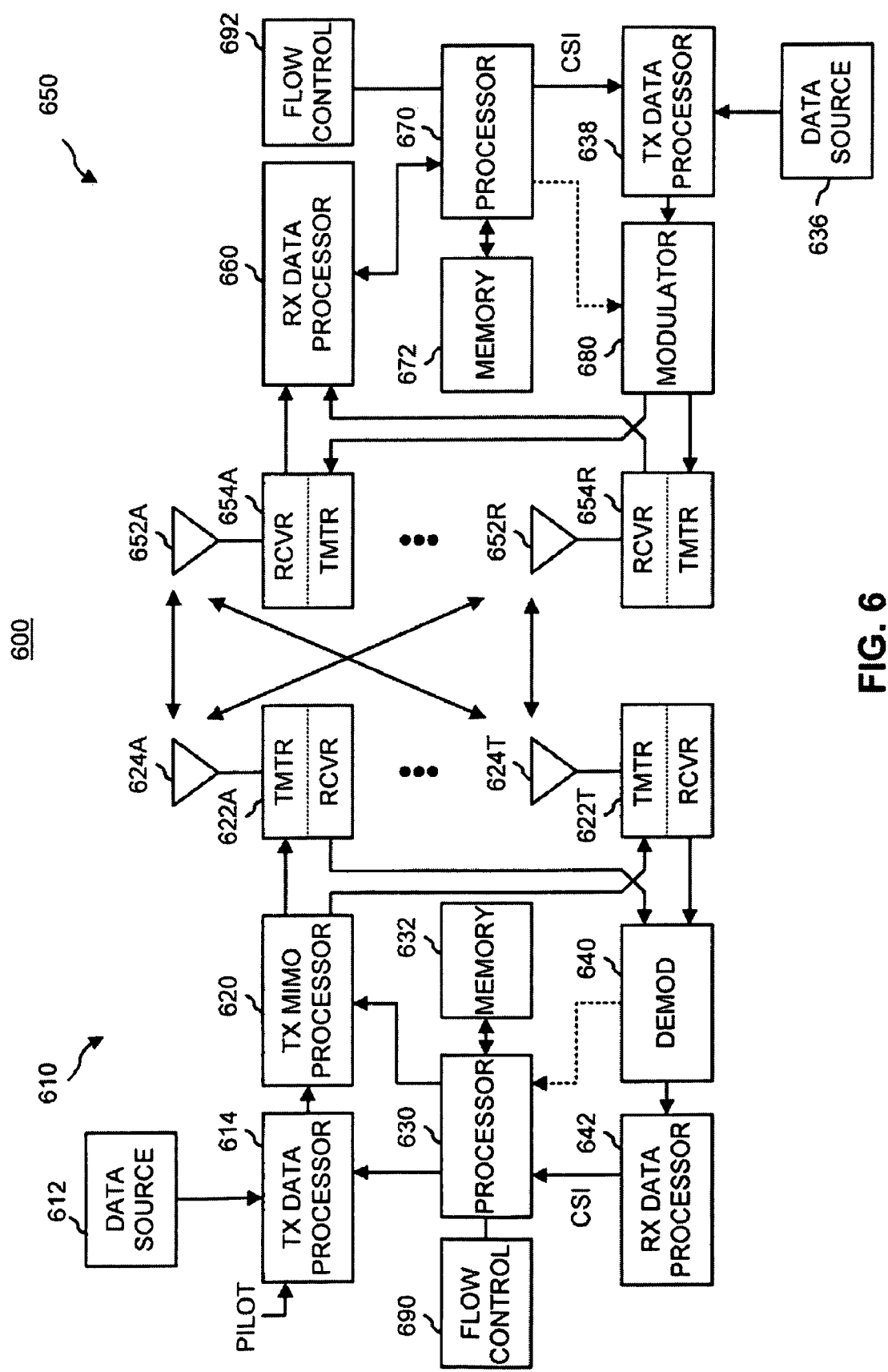
FIG. 6 is a simplified block diagram of several sample aspects of communication components.

The teachings herein may be incorporated into a device employing various components for communicating with at least one other wireless node. FIG. 6 depicts several sample components that may be employed to facilitate communication between devices. Specifically, FIG. 6 illustrates a device 610 (e.g., an access node) and a device 650 (e.g., an access terminal) of a MIMO system 600. At the device 610, traffic data for a number of data streams is provided from a data source 612 to a transmit ("TX") data processor 614.

In some aspects, each data stream is transmitted over a respective transmit antenna. The TX data processor 614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 630. A data memory 632 may store program code, data, and other information used by the processor 630 or other components of the device 610.

The modulation symbols for all data streams are then provided to a TX MIMO processor 620, which may further process the modulation symbols (e.g., for OFDM). The TX MIMO processor 620 then provides $N_T$ modulation symbol streams to $N_T$ transceivers ("XCVR") 622A through 622T. In certain embodiments, the TX MIMO processor 620 applies beam-forming weights to the symbols of the data streams and to the antenna from which the symbol is being transmitted.

Each transceiver 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 622A through 622T are then transmitted from $N_T$ antennas 624A through 624T, respectively.

At the device 650, the transmitted modulated signals are received by $N_R$ antennas 652A through 652R and the received signal from each antenna 652 is provided to a respective transceiver ("XCVR") 654A through 654R. Each transceiver 654 conditions (e.g., filters, amplifies, and downconverts) a respective received signal, digitizes the conditioned signal to provide samples, and further processes the samples to provide a corresponding "received" symbol stream.

A receive ("RX") data processor 660 then receives and processes the $N_R$ received symbol streams from $N_R$ transceivers 654 based on a particular receiver processing technique to provide $N_T$ "detected" symbol streams. The RX data processor 660 then demodulates, deinterleaves, and decodes each detected symbol stream to recover the traffic data for the data stream. The processing by the RX data processor 660 is complementary to that performed by the TX MIMO processor 620 and the TX data processor 614 at the device 610.

A processor 670 periodically determines which pre-coding matrix to use (discussed below). The processor 670 formulates a reverse link message comprising a matrix index portion and a rank value portion. A data memory 672 may store program code, data, and other information used by the processor 670 or other components of the device 650.

The reverse link message may comprise various types of information regarding the communication link and/or the received data stream. The reverse link message is then processed by a TX data processor 638, which also receives traffic data for a number of data streams from a data source 636, modulated by a modulator 680, conditioned by the transceivers 654A through 654R, and transmitted back to the device 610.

At the device 610, the modulated signals from the device 650 are received by the antennas 624, conditioned by the transceivers 622, demodulated by a demodulator ("DEMOD") 640, and processed by a RX data processor 642 to extract the reverse link message transmitted by the device 650. The processor 630 then determines which pre-coding matrix to use for determining the beam-forming weights then processes the extracted message.

FIG. 6 also illustrates that the communication components may include one or more components that perform power control operations as taught herein. For example, a flow control component 690 may cooperate with the processor 630 and/or other components of the device 610 to send/receive signals to/from another device (e.g., device 650) as taught herein. Similarly, a flow control component 692 may cooperate with the processor 670 and/or other components of the device 650 to send/receive signals to/from another device (e.g., device 610). It should be appreciated that for each device 610 and 650 the functionality of two or more of the described components may be provided by a single component. For example, a single processing component may provide the functionality of the flow control component 690 and the processor 630 and a single processing component may provide the functionality of the flow control component 692 and the processor 670.

The teachings herein may be incorporated into (e.g., implemented within or performed by) a variety of apparatuses (e.g., devices). For example, a wireless node may be configured or referred to as an access node, an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Other wireless nodes may be referred to as access terminals. An access terminal also may be known as a mobile node, a subscriber station, subscriber unit, a mobile station, a remote station, a remote terminal, a user terminal, a user agent, a user device, or user equipment. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access device (e.g., an access node) for a communication system. Such an access device may provide, for example, connectivity for or to a network (e.g., a wide area network such as the Internet or a cellular network) via a wired or wireless communication link. Accordingly, the access device may enable another device (e.g., an access terminal) to access the network or some other functionality. In addition, it should be appreciated that one or both of the devices may be portable or, in some cases, relatively non-portable. Also, it should be appreciated that a wireless node also may be capable of transmitting and/or receiving information in a non-wireless manner (e.g., via a wired connection) via an appropriate communication interface.

A wireless node may communicate via one or more wireless communication links that are based on or otherwise support any suitable wireless communication technology. For example, in some aspects a wireless node may associate with a network. In some aspects the network may comprise a local area network, a wide area network, or some other type of network. A wireless node may support or otherwise use one or more of a variety of wireless communication technologies, protocols, or standards such as, for example, CDMA, TDMA, OFDM, OFDMA, WiMAX, and Wi-Fi. Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a node may comprise a wireless transceiver with associated transmitter and receiver components that may include various components (e.g., signal generators and signal processors) that facilitate communication over a wireless medium.

Figure 7:
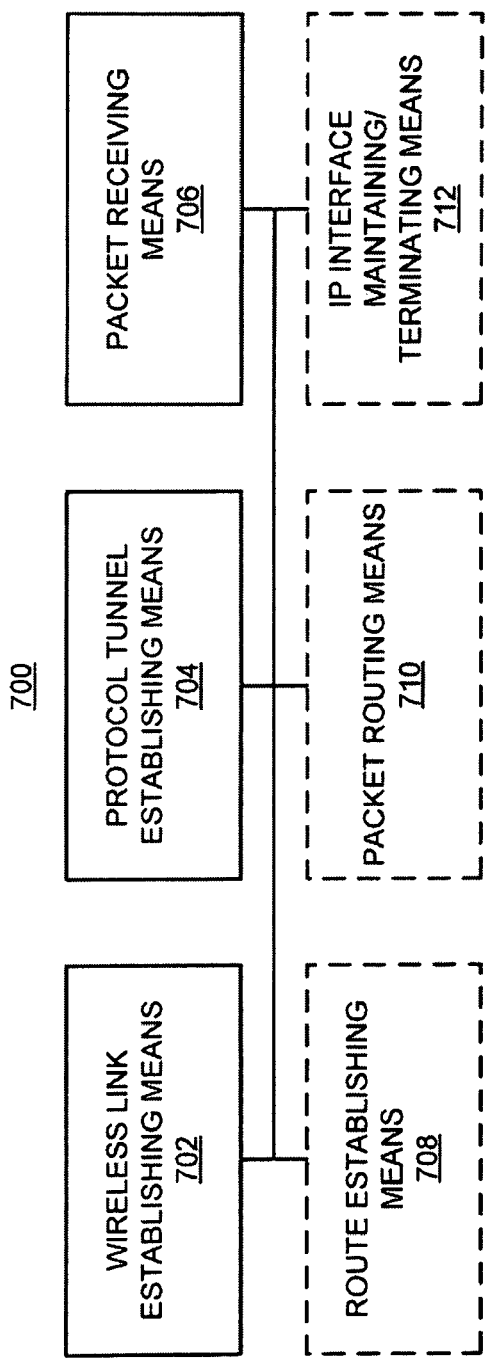
FIGS. 7 and 8 are simplified block diagrams illustrating several sample aspects of apparatuses configured to provide seamless handoffs as taught herein.
Figure 8:
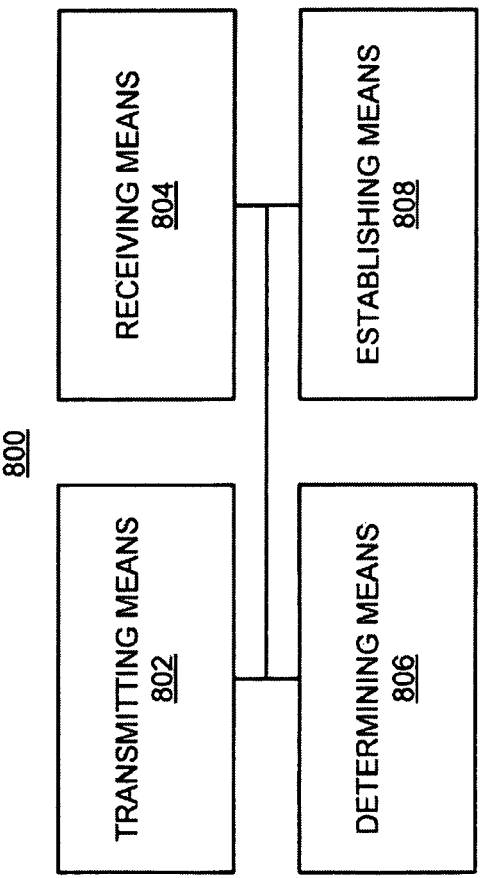

The components described herein may be implemented in a variety of ways. Referring to FIGS. 7 and 8, apparatuses 700 and 800 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 7 and 8 are optional.

The apparatuses 700 and 800 include one or more modules that may perform one or more of the functions described above with regard to various figures. For example, a wireless link establishing means 702 may correspond to a wireless access controller as discussed herein. A protocol tunnel establishing means 704 may correspond to, for example, a tunnel definer as discussed herein. A packet receiving means 706 may correspond to, for example, a communication processor as discussed herein. A route establishing means 708 may correspond to, for example, a route controller as discussed herein. A packet routing means 710 may correspond to, for example, a communication processor as discussed herein. An IP interface maintaining means or IP interface terminating means 712 may correspond to, for example, an IP controller as discussed herein. A transmitting means 802 may correspond to, for example, a transmitter as discussed herein. A receiving means 804 may correspond to, for example, a receiver as discussed herein. A determining means 806 may correspond to, for example, an IP controller as discussed herein. An establishing means 808 may correspond to, for example, an IP controller as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
    establishing, at an access terminal, a first wireless link with first network access node to receive a first set of packets from a first first-hop router;
    establishing, at the access terminal, a second wireless link with a second network access node to perform a handoff from the first network access node to the second network access node;
    establishing, at the access terminal, a protocol tunnel to the first network access node via the second network access node;

receiving a second set of packets at the access terminal from the first first-hop router via the protocol tunnel;

establishing the second network access node as a foreign agent for the access terminal; and receiving a third set of packets at the access terminal from a second first-hop router via the second network access node while maintaining the protocol tunnel, prior to receiving a last packet of the second set of packets at the access terminal via the protocol tunnel, and after the second network access node has been established as the foreign agent for the access terminal.

2. The method of claim 1, further comprising:

establishing a first route that is used for routing the first set of packets from the first network access node to a first Internet Protocol interface; and establishing a second route that is used for routing the third set of packets from the second network access node to a second Internet Protocol interface.

3. The method of claim 2, wherein the second set of packets are associated with the first route at the first network access node and are sent over the protocol tunnel for routing via the second route at the second network access node.

4. The method of claim 3, wherein:

the access terminal receives the second set of packets from the protocol tunnel via the second route; and the access terminal routes the second set of data packets from the protocol tunnel to the first route for delivery to the first Internet Protocol interface.

5. The method of claim 2, wherein the access terminal maintains the first Internet Protocol interface to receive the second set of packets from the first first-hop router and concurrently maintains the second Internet Protocol interface to receive the third set of packets from the second first-hop router.

6. The method of claim 2, wherein the protocol tunnel enables the first Internet Protocol interface to receive the second set of packets from the first first-hop router after the second Internet Protocol interface is established.

7. The method of claim 2, further comprising terminating the first Internet Protocol interface if it is determined that traffic flow between the first first-hop router and the first Internet Interface Protocol has ceased.

8. The method of claim 2, further comprising terminating the first Internet Protocol interface if the first network access node is no longer listed in a route set of the access terminal.

9. The method of claim 1, wherein the receipt of the second set of packets via the protocol tunnel mitigates packet loss during the handoff.

10. The method of claim 1, wherein at least a portion of the second set of packets is received via the protocol tunnel after receiving at least a portion of the third set of packets from the second first-hop router.

11. The method of claim 1, wherein:

the first network access node comprises a first base station; and the second network access node comprises a second base station.

12. The method of claim 11, wherein:

the first first-hop router comprises a first access gateway; and the second first-hop router comprises a second access gateway.

13. An apparatus for wireless communication, comprising:

a wireless access controller configured to establish, at an access terminal, a first wireless link with first network access node to receive a first set of packets from a first first-hop router, and further configured to establish, at the access terminal, a second wireless link with a second network access node to perform a handoff from the first network access node to the second network access node;

a tunnel definer configured to establish, at the access terminal, a protocol tunnel to the first network access node via the second network access node;

a communication processor configured to receive a second set of packets at the access terminal from the first first-hop router via the protocol tunnel;

wherein the wireless access controller is further configured to establish the second network access node as a foreign agent for the access terminal; and wherein the communication processor is further configured to receive a third set of packets at the access terminal from a second first-hop router via the second network access node while maintaining the protocol tunnel, prior to receiving a last packet of the second set of packets at the access terminal via the protocol tunnel, and after the second network access node has been established as the foreign agent for the access terminal.

14. The apparatus of claim 13, further comprising a route controller configured to:

establish a first route that is used for routing the first set of packets from the first network access node to a first Internet Protocol interface; and establish a second route that is used for routing the third set of packets from the second network access node to a second Internet Protocol interface.

15. The apparatus of claim 14, wherein the second set of packets are associated with the first route at the first network access node and are sent over the protocol tunnel for routing via the second route at the second network access node.

16. The apparatus of claim 15, wherein the communication processor is further configured to:

receive the second set of packets from the protocol tunnel via the second route; and route the second set of data packets from the protocol tunnel to the first route for delivery to the first Internet Protocol interface.

17. The apparatus of claim 14, further comprising an Internet Protocol controller configured to maintain the first Internet Protocol interface to receive the second set of packets from the first first-hop router and concurrently maintain the second Internet Protocol interface to receive the third set of packets from the second first-hop router.

18. The apparatus of claim 14, wherein the protocol tunnel enables the first Internet Protocol interface to receive the second set of packets from the first first-hop router after the second Internet Protocol interface is established.

19. The apparatus of claim 14, further comprising an Internet Protocol controller configured to terminate the first Internet Protocol interface if it is determined that traffic flow between the first first-hop router and the first Internet Interface Protocol has ceased.

20. The apparatus of claim 14, further comprising an Internet Protocol controller configured to terminate the first Internet Protocol interface if the first network access node is no longer listed in a route set of the access terminal.

21. The apparatus of claim 13, wherein the receipt of the second set of packets via the protocol tunnel mitigates packet loss during the handoff.

22. The apparatus of claim 13, wherein at least a portion of the second set of packets is received via the protocol tunnel after receiving at least a portion of the third set of packets from the second first-hop router.

23. The apparatus of claim 13, wherein:
the first network access node comprises a first base station; and
the second network access node comprises a second base station.

24. The apparatus of claim 23, wherein:
the first first-hop router comprises a first access gateway; and
the second first-hop router comprises a second access gateway.

25. An apparatus for wireless communication, comprising:
means for establishing, at an access terminal, a first wireless link with first network access node to receive a first set of packets from a first first-hop router;
means for establishing, at the access terminal, a second wireless link with a second network access node to perform a handoff from the first network access node to the second network access node;
means for establishing, at the access terminal, a protocol tunnel to the first network access node via the second network access node;
means for receiving a second set of packets at the access terminal from the first first-hop router via the protocol tunnel;
means for establishing the second network access node as a foreign agent for the access terminal; and
means for receiving a third set of packets at the access terminal from a second first-hop router via the second network access node while maintaining the protocol tunnel, prior to receiving a last packet of the second set of packets at the access terminal via the protocol tunnel, and after the second network access node has been established as the foreign agent for the access terminal.

26. A computer-program product for wireless communication, comprising:
a non-transitory computer-readable medium comprising code for causing a computer to:
establish, at an access terminal, a first wireless link with first network access node to receive a first set of packets from a first first-hop router;
establish, at the access terminal, a second wireless link with a second network access node to perform a handoff from the first network access node to the second network access node;
establish, at the access terminal, a protocol tunnel to the first network access node via the second network access node;
receive a second set of packets at the access terminal from the first first-hop router via the protocol tunnel;
establish the second network access node as a foreign agent for the access terminal; and
receive a third set of packets at the access terminal from a second first-hop router via the second network access node while maintaining the protocol tunnel, prior to receiving a last packet of the second set of packets at the access terminal via the protocol tunnel, and after the second network access node has been established as the foreign agent for the access terminal.

27. The method of claim 1, wherein establishing the second network access node as the foreign agent for the access terminal comprises removing the first network access node as the foreign agent for the access terminal.

28. The method of claim 1, further comprising:
receiving at least one packet of the third set of packets prior receiving the last packet of the second set of packets at the access terminal.

29. The method of claim 1, wherein the protocol tunnel is a bidirectional protocol tunnel.

30. The method of claim 29, further comprising:
transmitting a fourth set of packets from the access terminal to the first network access node via the second network access node and the bidirectional protocol tunnel.

31. The apparatus of claim 13, wherein the wireless access controller is further configured to remove the first network access node as the foreign agent for the access terminal when establishing the second network access node as the foreign agent for the access terminal comprises.

32. The apparatus of claim 13, wherein the communication processor is further configured to receive at least one packet of the third set of packets prior receiving the last packet of the second set of packets at the access terminal.

33. The apparatus of claim 13, wherein the protocol tunnel is a bidirectional protocol tunnel.

34. The apparatus of claim 33, further comprising:
a transmitter configured to transmit a fourth set of packets from the access terminal to the first network access node via the second network access node and the bidirectional protocol tunnel.

* * * * *